United States Patent
Nourse et al.

(10) Patent No.: US 9,491,255 B2
(45) Date of Patent: Nov. 8, 2016

(54) METHOD AND APPARATUS FOR PRE-FETCHING REMOTE RESOURCES FOR SUBSEQUENT DISPLAY ON A MOBILE COMPUTING DEVICE

(71) Applicant: GOOGLE INC., Mountain View, CA (US)

(72) Inventors: Thomas Gregory Nourse, Half Moon Bay, CA (US); Hans-Olav CaveLie, San Francisco, CA (US); Ronghui Zhu, Sunnyvale, CA (US); Andrew Miller, Seattle, WA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/949,787

(22) Filed: Nov. 23, 2015

(65) Prior Publication Data

US 2016/0080518 A1    Mar. 17, 2016

Related U.S. Application Data

(63) Continuation of application No. 13/316,271, filed on Dec. 9, 2011, now Pat. No. 9,197,713.

(51) Int. Cl.
*G06F 15/173* (2006.01)
*H04L 29/08* (2006.01)
(Continued)

(52) U.S. Cl.
CPC ........... *H04L 67/2847* (2013.01); *G01C 21/26* (2013.01); *G01C 21/32* (2013.01); *H04L 67/02* (2013.01); *H04L 67/42* (2013.01); *H04W 4/028* (2013.01)

(58) Field of Classification Search
CPC ................... G06F 17/30241; G06F 17/30994; G06F 17/3087; G01C 21/3632; G01C 21/3415; G01C 21/26; H04L 67/2847; H04L 67/42
USPC .................................................. 709/200, 226
See application file for complete search history.

(56) References Cited

U.S. PATENT DOCUMENTS

| 4,984,279 A | 1/1991 | Kidney et al. |
| 5,345,086 A | 9/1994 | Bertram |

(Continued)

FOREIGN PATENT DOCUMENTS

| EP | 1 288 622 A2 | 3/2003 |
| KR | 10-2008-071228 | 8/2008 |

(Continued)

OTHER PUBLICATIONS

Descampe et al., "Data Prefetching for Smooth Navigation of Large Scale JPEG 2000 Images," IEEE, Multimedia and Expo, pp. 1-4 (2005).

(Continued)

*Primary Examiner* — Anthony Mejia
(74) *Attorney, Agent, or Firm* — Marshall, Gerstein & Borun LLP

(57) ABSTRACT

A computer-implemented method and system for pre-fetching remote resource data from a remote mapping system for display on a client computing device is disclosed. Data received at a client device from an online mapping system in response to a query from the client device includes vector and remote resource data. Vector data is rasterized by the client device to depict graphical elements that are easily described by mathematical formulas. Remote resource data includes digital map elements that are not easily described by vectors, but instead, must be relayed to the client device as either bitmaps or references (e.g., URLs) to remote resources that are resolved at the backend or the client device. This remote resource data is prefetched to a client device so that it will be available for subsequent mapping application searches without resolving a corresponding reference to the remote resource data for each search.

20 Claims, 7 Drawing Sheets

(51) Int. Cl.
*H04L 29/06* (2006.01)
*G01C 21/26* (2006.01)
*G01C 21/32* (2006.01)
*H04W 4/02* (2009.01)

(56) References Cited

U.S. PATENT DOCUMENTS

| | | | |
|---|---|---|---|
| 5,793,310 A | 8/1998 | Watanabe et al. | |
| 5,848,373 A | 12/1998 | DeLorme et al. | |
| 5,905,508 A * | 5/1999 | Beitel | G06T 11/206 345/440 |
| 6,061,688 A | 5/2000 | Kilpatrick et al. | |
| 6,073,076 A | 6/2000 | Crowley et al. | |
| 6,094,685 A | 7/2000 | Greenberg et al. | |
| 6,173,277 B1 | 1/2001 | Ashby et al. | |
| 6,191,782 B1 * | 2/2001 | Mori | H04N 5/4401 348/E5.099 |
| 6,199,150 B1 | 3/2001 | Yoshikawa | |
| 6,330,453 B1 | 12/2001 | Suzuki et al. | |
| 6,400,690 B1 | 6/2002 | Liu et al. | |
| 6,421,354 B1 * | 7/2002 | Godlewski | G08C 17/00 340/870.01 |
| 6,442,757 B1 | 8/2002 | Hancock et al. | |
| 6,453,233 B1 | 9/2002 | Kato | |
| 6,546,334 B1 | 4/2003 | Fukuchi et al. | |
| 6,571,279 B1 | 5/2003 | Herz et al. | |
| 6,615,131 B1 | 9/2003 | Rennard et al. | |
| 6,671,424 B1 | 12/2003 | Skoll et al. | |
| 6,691,128 B2 | 2/2004 | Natesan et al. | |
| 6,853,911 B1 | 2/2005 | Sakarya | |
| 6,889,134 B2 | 5/2005 | Nakane et al. | |
| 7,006,820 B1 | 2/2006 | Parker et al. | |
| 7,050,905 B2 | 5/2006 | Nemeth | |
| 7,136,748 B2 | 11/2006 | Umezu et al. | |
| 7,263,368 B2 | 8/2007 | Knauerhase et al. | |
| 7,315,259 B2 | 1/2008 | Sacks | |
| 7,327,349 B2 | 2/2008 | Robbins et al. | |
| 7,461,528 B2 | 12/2008 | Taniguchi et al. | |
| 7,464,109 B2 | 12/2008 | Modi | |
| 7,472,172 B2 | 12/2008 | Anderson et al. | |
| 7,502,780 B2 | 3/2009 | Thorpe | |
| 7,502,876 B1 | 3/2009 | Nemirovsky et al. | |
| 7,529,639 B2 | 5/2009 | Rasanen et al. | |
| 7,551,182 B2 | 6/2009 | Bethune et al. | |
| 7,571,422 B2 | 8/2009 | Adel et al. | |
| 7,577,520 B2 | 8/2009 | Nomura | |
| 7,584,434 B2 | 9/2009 | Okamura | |
| 7,610,147 B2 | 10/2009 | Umezu et al. | |
| 7,663,671 B2 | 2/2010 | Gallagher et al. | |
| 7,710,421 B2 | 5/2010 | Muramatsu | |
| 7,711,473 B2 | 5/2010 | Sekine et al. | |
| 7,734,412 B2 | 6/2010 | Shi et al. | |
| 7,739,037 B2 | 6/2010 | Sumizawa et al. | |
| 7,796,837 B2 | 9/2010 | Lueck | |
| 7,831,383 B2 | 11/2010 | Oohashi | |
| 7,831,387 B2 | 11/2010 | Golding et al. | |
| 7,839,421 B2 | 11/2010 | Bethune et al. | |
| RE41,983 E * | 12/2010 | Wallner | H03M 7/30 341/50 |
| 7,873,465 B2 | 1/2011 | Geelen et al. | |
| 7,920,968 B2 | 4/2011 | Chapin et al. | |
| 7,925,624 B2 | 4/2011 | Vosshall et al. | |
| 7,925,982 B2 | 4/2011 | Parker et al. | |
| 7,962,565 B2 | 6/2011 | Coker | |
| 7,974,959 B2 | 7/2011 | Sawai et al. | |
| 7,975,025 B1 | 7/2011 | Szabo et al. | |
| 7,983,659 B2 | 7/2011 | Shinya | |
| 7,996,445 B2 | 8/2011 | Fair et al. | |
| 8,005,612 B2 | 8/2011 | Asahara et al. | |
| 8,010,407 B1 | 8/2011 | Santoro et al. | |
| 8,014,796 B2 | 9/2011 | Boudreau et al. | |
| 8,014,945 B2 | 9/2011 | Cooper et al. | |
| 8,032,297 B2 | 10/2011 | Jakobson | |
| 8,060,389 B2 | 11/2011 | Johnson | |
| 8,060,406 B2 | 11/2011 | Blegen | |
| 8,060,582 B2 | 11/2011 | Bliss et al. | |
| 8,078,641 B2 | 12/2011 | Mao et al. | |
| 8,095,307 B2 | 1/2012 | Ebert et al. | |
| 8,126,885 B2 | 2/2012 | Prasad et al. | |
| 8,180,851 B1 | 5/2012 | CaveLie | |
| 8,189,902 B1 | 5/2012 | Carson | |
| 8,204,966 B1 | 6/2012 | Mendis et al. | |
| 8,229,914 B2 | 7/2012 | Ramer et al. | |
| 8,280,414 B1 | 10/2012 | Nourse et al. | |
| 8,301,371 B2 | 10/2012 | Sheha et al. | |
| 8,340,898 B2 * | 12/2012 | Currie | G01C 21/32 340/993 |
| 8,361,543 B2 | 1/2013 | Nielsen et al. | |
| 8,363,065 B2 | 1/2013 | Scott et al. | |
| 8,385,591 B1 | 2/2013 | Anguelov et al. | |
| 8,489,332 B2 * | 7/2013 | Tomobe | G01C 21/32 701/410 |
| 8,489,669 B2 | 7/2013 | Johnson | |
| 8,516,041 B1 * | 8/2013 | Miles | H04L 67/2847 709/203 |
| 8,538,685 B2 | 9/2013 | Johnson | |
| 8,543,130 B2 * | 9/2013 | Golds | G01S 19/24 342/357.21 |
| 8,549,105 B1 | 10/2013 | Nourse et al. | |
| 8,683,008 B1 | 3/2014 | CaveLie | |
| 8,711,181 B1 | 4/2014 | Nourse et al. | |
| 8,803,920 B2 | 8/2014 | Kalai et al. | |
| 8,805,959 B1 | 8/2014 | Mendis et al. | |
| 8,812,031 B2 | 8/2014 | CaveLie et al. | |
| 8,849,942 B1 | 9/2014 | Foster et al. | |
| 2002/0067353 A1 | 6/2002 | Kenyon et al. | |
| 2002/0133491 A1 | 9/2002 | Sim et al. | |
| 2003/0160980 A1 * | 8/2003 | Olsson | G03F 1/14 358/1.9 |
| 2003/0187984 A1 | 10/2003 | Banavar et al. | |
| 2004/0044752 A1 | 3/2004 | Hamaguchi et al. | |
| 2004/0049784 A1 | 3/2004 | Grzeczkowski | |
| 2004/0117108 A1 * | 6/2004 | Nemeth | G01C 21/3632 701/421 |
| 2004/0203998 A1 | 10/2004 | Knauerhase et al. | |
| 2004/0204849 A1 | 10/2004 | Shipley et al. | |
| 2004/0205199 A1 * | 10/2004 | Gormish | H04L 29/06 709/229 |
| 2004/0220730 A1 | 11/2004 | Chen et al. | |
| 2005/0140524 A1 | 6/2005 | Kato et al. | |
| 2005/0287509 A1 * | 12/2005 | Mohler | G09B 7/00 434/350 |
| 2006/0007022 A1 | 1/2006 | Endo et al. | |
| 2006/0026170 A1 * | 2/2006 | Kreitler | G06F 17/30241 |
| 2006/0067224 A1 | 3/2006 | Ohara | |
| 2006/0069749 A1 | 3/2006 | Herz et al. | |
| 2006/0080032 A1 * | 4/2006 | Cooper | G01C 21/32 701/532 |
| 2006/0106534 A1 | 5/2006 | Kawamata et al. | |
| 2006/0129636 A1 * | 6/2006 | Matsuura | G01C 21/3682 709/203 |
| 2006/0184541 A1 * | 8/2006 | Kim | G01C 21/3682 |
| 2006/0190812 A1 * | 8/2006 | Ellenby | G06F 17/30259 715/209 |
| 2006/0195256 A1 | 8/2006 | Nakamura et al. | |
| 2006/0277271 A1 | 12/2006 | Morse et al. | |
| 2007/0011171 A1 * | 1/2007 | Nurminen | H04L 67/18 |
| 2007/0050128 A1 | 3/2007 | Lee et al. | |
| 2007/0080830 A1 | 4/2007 | Sacks | |
| 2007/0126605 A1 | 6/2007 | Aleksic et al. | |
| 2007/0143014 A1 | 6/2007 | Sekine et al. | |
| 2007/0218891 A1 | 9/2007 | Cox | |
| 2007/0229490 A1 * | 10/2007 | Boudreau | G01C 21/32 345/418 |
| 2007/0242077 A1 | 10/2007 | Danan | |
| 2007/0273558 A1 | 11/2007 | Smith et al. | |
| 2007/0282621 A1 | 12/2007 | Altman et al. | |
| 2007/0282915 A1 | 12/2007 | Vosshall et al. | |
| 2008/0065329 A1 | 3/2008 | Wilcox et al. | |
| 2008/0071988 A1 | 3/2008 | Schloter et al. | |
| 2008/0082225 A1 | 4/2008 | Barrett | |
| 2008/0086264 A1 | 4/2008 | Fisher | |
| 2008/0095472 A1 * | 4/2008 | Smith | G06F 17/30247 382/305 |

(56) References Cited

U.S. PATENT DOCUMENTS

| | | |
|---|---|---|
| 2008/0102857 A1 | 5/2008 | Kim |
| 2008/0132249 A1 | 6/2008 | Hamilton |
| 2008/0154655 A1 | 6/2008 | Hartmann et al. |
| 2008/0177469 A1 | 7/2008 | Geelen et al. |
| 2008/0192053 A1 | 8/2008 | Howell et al. |
| 2008/0195311 A1 | 8/2008 | Karaoguz et al. |
| 2008/0214210 A1 | 9/2008 | Rasanen et al. |
| 2008/0215240 A1* | 9/2008 | Howard ............... G06F 3/0488 701/469 |
| 2008/0238723 A1 | 10/2008 | Fein et al. |
| 2008/0249969 A1 | 10/2008 | Tsui et al. |
| 2008/0270579 A1 | 10/2008 | Herz et al. |
| 2008/0291205 A1 | 11/2008 | Rasmussen et al. |
| 2009/0030778 A1 | 1/2009 | Zapata et al. |
| 2009/0054103 A1 | 2/2009 | Stavenow et al. |
| 2009/0063042 A1 | 3/2009 | Santesson et al. |
| 2009/0125228 A1 | 5/2009 | Dicke et al. |
| 2009/0128483 A1 | 5/2009 | Robbins et al. |
| 2009/0132163 A1 | 5/2009 | Ashley, Jr. et al. |
| 2009/0153563 A1 | 6/2009 | Tudose |
| 2009/0157967 A1* | 6/2009 | Greiner ............... G06F 9/30047 711/125 |
| 2009/0182500 A1 | 7/2009 | Dicke |
| 2009/0198767 A1 | 8/2009 | Jakobson et al. |
| 2009/0210388 A1 | 8/2009 | Elson et al. |
| 2009/0228211 A1 | 9/2009 | Rasanen et al. |
| 2009/0244095 A1* | 10/2009 | Bowman ........... G06F 17/30899 345/629 |
| 2009/0281718 A1* | 11/2009 | Gibran ................ G01C 21/32 701/532 |
| 2009/0287750 A1 | 11/2009 | Banavar et al. |
| 2009/0319177 A1 | 12/2009 | Khosravy et al. |
| 2009/0319181 A1 | 12/2009 | Khosravy et al. |
| 2009/0319188 A1 | 12/2009 | Otto |
| 2009/0326810 A1 | 12/2009 | Callaghan et al. |
| 2010/0017129 A1 | 1/2010 | Wilcox et al. |
| 2010/0020091 A1 | 1/2010 | Rasmussen et al. |
| 2010/0030460 A1 | 2/2010 | Sawai et al. |
| 2010/0106397 A1 | 4/2010 | Van Essen |
| 2010/0106801 A1 | 4/2010 | Bliss et al. |
| 2010/0117810 A1 | 5/2010 | Hagiwara et al. |
| 2010/0131186 A1 | 5/2010 | Geelen et al. |
| 2010/0153007 A1 | 6/2010 | Crowley |
| 2010/0174721 A1 | 7/2010 | Mou |
| 2010/0179940 A1 | 7/2010 | Gilder et al. |
| 2010/0182500 A1 | 7/2010 | Ishii et al. |
| 2010/0235394 A1* | 9/2010 | Sukanen ............. G06F 17/3087 707/782 |
| 2010/0250646 A1 | 9/2010 | Dunagan et al. |
| 2010/0274899 A1 | 10/2010 | Shrivastava et al. |
| 2010/0321399 A1 | 12/2010 | Ellren et al. |
| 2010/0332120 A1* | 12/2010 | Tomobe ................ G01C 21/32 701/533 |
| 2010/0333085 A1 | 12/2010 | Criddle et al. |
| 2011/0054776 A1 | 3/2011 | Petrov et al. |
| 2011/0093515 A1 | 4/2011 | Albanese |
| 2011/0095993 A1 | 4/2011 | Zuverink |
| 2011/0098917 A1 | 4/2011 | LeBeau et al. |
| 2011/0098918 A1 | 4/2011 | Siliski et al. |
| 2011/0130949 A1* | 6/2011 | Arrasvuori ......... G01C 21/3638 701/532 |
| 2011/0144899 A1 | 6/2011 | Soelberg |
| 2011/0161875 A1 | 6/2011 | Kankainen |
| 2011/0213798 A1 | 9/2011 | Osuka et al. |
| 2011/0276263 A1 | 11/2011 | Shimotani et al. |
| 2011/0300848 A1 | 12/2011 | Boudreau et al. |
| 2011/0306304 A1 | 12/2011 | Forutanpour et al. |
| 2011/0307648 A1 | 12/2011 | Nomura |
| 2011/0316854 A1 | 12/2011 | Vandrovec |
| 2012/0005290 A1* | 1/2012 | Cooper ................. H04W 4/02 709/206 |
| 2012/0022786 A1 | 1/2012 | Siliski et al. |
| 2012/0022787 A1 | 1/2012 | LeBeau et al. |
| 2012/0038662 A1 | 2/2012 | Dicklin et al. |
| 2012/0083995 A1 | 4/2012 | Vorona |
| 2012/0146809 A1* | 6/2012 | Oh .......................... G08G 1/205 340/901 |
| 2012/0209818 A1 | 8/2012 | Richter et al. |
| 2012/0221239 A1* | 8/2012 | Cooper .................. H04W 4/02 701/409 |
| 2012/0253488 A1 | 10/2012 | Shaw et al. |
| 2012/0254804 A1 | 10/2012 | Sheha et al. |
| 2012/0289147 A1 | 11/2012 | Raleigh et al. |
| 2013/0097197 A1 | 4/2013 | Rincover et al. |
| 2013/0147846 A1 | 6/2013 | Kalai et al. |
| 2013/0325307 A1 | 12/2013 | Agarwal et al. |
| 2014/0073358 A1 | 3/2014 | Sridhar et al. |

FOREIGN PATENT DOCUMENTS

| | | |
|---|---|---|
| WO | WO-98/28714 A1 | 7/1998 |
| WO | WO-2009/027161 A1 | 3/2009 |

OTHER PUBLICATIONS

Extended European Search Report for Application No. 12855169.4, dated Mar. 23, 2015.
Google Developers, "Google Maps API," (2012). Retrieved from the Internet on Aug. 31, 2012: <URL:https://developers.google.com/maps/>.
International Preliminary Report on Patentability for Application No. PCT/US2012/051574, dated Jun. 17, 2014.
International Preliminary Report on Patentability for Application No. PCT/US2012/051577, dated Jun. 17, 2014.
International Preliminary Report on Patentability for Application No. PCT/US2012/065002, dated May 20, 2014.
International Preliminary Report on Patentability for Application No. PCT/US2012/065008, dated Jun. 10, 2014.
International Preliminary Report on Patentabillity for Application No. PCT/US2012/051564, dated Apr. 1, 2014.
International Search Report and Written Opinion for Application No. PCT/US2012/051574, dated Feb. 15, 2013.
International Search Report and Written Opinion for Application No. PCT/US2012/051577, dated Feb. 15, 2013.
International Search Report and Written Opinion for Application No. PCT/US2012/065002, dated Mar. 29, 2013.
International Search Report and Written Opinion for Application No. PCT/US2012/065008, dated Mar. 29, 2013.
International Search Report for Application No. PCT/US2012/051564, dated Feb. 18, 2013.
Kirchner et al. "A Location-aware Prefetchting Mechanism," Project work at Distributed Information Systems Laboratory LSIR (2004).
Magdalene et al., "Cache Prefetch and Replacement with Dual Valid Scopes for Location Dependent Data in Mobile Environments," Proceedings of the 11th International Conference on Information Integration and Web-Based Applications & Services, pp. 364-371 (2009).
Mapquest, "JavaScript Maps API," (2012). Retrieved from the Internet on Aug. 31, 2012: <URL:http://developer.mapquest.com/web/products/featured/javascript>.
Molina, "Aiming and Guiding Navigation with a Non-visual GPS Application," Department of Design Sciences Faculty of Engineering, Lund University (2010).
MSDN, "Get Started Using Bing Maps," (2012). Retrieved from the Internet on Aug. 31, 2012: <URL:http://msdn.microsoft.com/en-us/library/dd877180.aspx>.
Office action for U.S. Appl. No. 13/244,717 dated Nov. 15, 2011.
Office action for U.S. Appl. No. 13/244,764 dated Nov. 28, 2011.
Piras et al., "Compact GML: merging mobile computing and mobile cartography," CRS4, Center for Advanced Studies, Research and Development in Sardinia (2004).
Reichenbacher et al., "The World in Your Pocket—Towards a Mobile Cartography," Proc. of the 20th International Cartographic Conference (2001).
Ren et al., "Using Semantic Caching to Manage Location Dependent Data in Mobile Computing," Proceedings of the Annual International Conference Onmobile Computing and Networking, pp. 210-221 (2000).

(56) References Cited

OTHER PUBLICATIONS

Weber, "Mobile Map Browsers: Anticipated User Interaction for Data Pre-Fetching," Thesis, The University of Maine, (2010).
Wiki, "API," (2012). Retrieved from the Internet on Aug. 31, 2012: <URL:http://wiki.openstreetmap.org/wiki/API>.
Extended European Search Report for Application No. 12857463.9, dated May 22, 2015.
Extended European Search Report for Application No. 12849400.2, dated May 13, 2015.

* cited by examiner

METHOD AND APPARATUS FOR PRE-FETCHING REMOTE RESOURCES FOR SUBSEQUENT DISPLAY ON A MOBILE COMPUTING DEVICE

CROSS-REFERENCE TO RELATED APPLICATIONS

This application is a continuation of U.S. application Ser. No. 13/316,271, filed Dec. 9, 2011 and titled "Method and Apparatus for Pre-Fetching Remote Resources for Subsequent Display on A Mobile Computing Device," the entire disclosure of which is expressly incorporated herein by reference.

FIELD OF TECHNOLOGY

The present disclosure relates generally to pre-fetching data from remote resources for subsequent display on a mobile computing device during periods of no connectivity with the source of the remote resource.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many mobile computing devices such as cellular phones, tablet computers, notebooks, etc., incorporate global positioning system (GPS) applications and related hardware. When actuated on the device, the GPS applications may communicate with a GPS transmitter or other GPS hardware on the device and a backend application server to provide a digital map of an area around the device's current position to a user, as well as label data and remote resource data. Digital map data may be downloaded to a device in chunks or "tiles" that, collectively make up a displayed map. These tiles may be in a vector format that includes resource locators for data that the receiving device must interpret, access, and download to render the complete tile.

However there may be circumstances when the mobile computing device is in an area with limited network, cellular, or other communication access with the backend application server, which limits, or otherwise precludes, immediate, real time access to remote data, potentially adversely affecting the user's experience.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

In one embodiment, a computer-implemented method for pre-fetching remote resource data to a mapping application executing on a client computing device for subsequent display on the client computing device may include several steps. For example, the method may send a request for mapping data from a client computing device to a remote mapping system. The method may also receive map tile data at the client computing device in response to the sent request for mapping data. The received map tile data may include vector data describing a first graphic feature and remote resource data describing a second graphic feature. The method may also store the remote resource data in a cache memory of the client computing device. Further, the method may subsequently retrieve the remote resource data from the cache memory of the client computing device without further communication between the remote mapping system and the client computing device in response to sending a second request for mapping data.

The method may also send a subsequent request for mapping data. In response to the subsequent request, the method may receive further map tile data. The further map tile data may include vector data from a previous request for mapping data. The further map tile data may include a reference to remote resource data corresponding to remote data stored in the cache memory. The method may also retrieve the remote resource data from the cache memory in response to receiving the further map tile data.

A further step of the method may analyze a user map search history data file to determine the remote resource data. Also, the method may analyze the request for mapping data to determine a second graphic feature. The second graphic feature may include a raster image of one or more of a road shield icon, a tree icon, a camping icon, a restaurant icon, a mass transit icon, or a hospital icon. The reference may also include a URL to a remote resource data source. Furthermore, the remote resource data received at the client computing device in response to the sent request for mapping data may include a remote resources data list including a plurality of references to remote data resources. The method may also resolve a reference to retrieve a graphic feature from one or more remote data resources.

In a further embodiment, a client computing device may comprise a processor, a memory, and a transceiver. The memory may store a mapping module including instructions for execution by the processor. The instructions may use the processor to cause a request for mapping data to be sent from the client computing device to a backend mapping system via a network connection. The transceiver may receive mapping data from the backend mapping system via the network connection. The transceiver may receive the mapping data in response to the sent request. The mapping data may include a reference to remote resource data. The mapping module may include further instructions to cause the processor to resolve the reference to the remote resource data. The transceiver may also receive the remote resource data in response to resolving the reference, and the processor may execute instructions to subsequently display the received remote resource data from a cache memory without further communication between the backend mapping system and the client computing device in response to sending a further request for mapping data including the reference to the remote resource data. The client computing device of claim may subsequently display the remote resource data from the cache memory in response to the mapping module causing further instructions to be executed to send a subsequent request for mapping data. A response to the subsequent request may include vector data and a reference to remote resource data from a previous request for mapping data. The mapping module may include further instructions to resolve the reference to the remote resource data of the response to the subsequent request by retrieving the remote resource data from the cache memory. The remote resource data received at the client computing device in response to the sent request for mapping data may include a remote resources data list including a plurality of references to remote data resources.

In a still further embodiment, a remote mapping system may comprise a processor and a memory in communication with the processor and storing a map controller including various instructions that may be executed by the processor. For example, the instructions may include instructions causing the processor to receive a request for mapping data from a client computing device. Other instructions may cause the processor, in response to the request, to construct a vector describing first graphic features of a graphical map and to resolve a reference to remote resource data for second graphic features of the graphical map. The vector may include instructions for the client computing device to rasterize the first graphic features. Still other instructions may cause the processor to send the vector and the remote resource data from the remote mapping system to the client computing device. The remote resource data may be stored in a cache memory of the client computing device. The client computing device may be further configured to subsequently retrieve the stored remote resource data from the cache memory without further communication between the remote mapping system and the client computing device in response to sending a subsequent request for mapping data. The instructions may further cause the processor to receive the subsequent request for mapping data from the client computing device. The processor may then construct another vector describing first graphic features of the graphical map and determine if references to remote resource data for second graphic features of the graphical map have been previously resolved. When the references have been previously resolved, the client computing device may be further configured to resolve the reference to the remote resource data by retrieving the remote resource data from the cache memory. The processor may also include instructions to send a remote resources data list to the client.

Figure 1A:
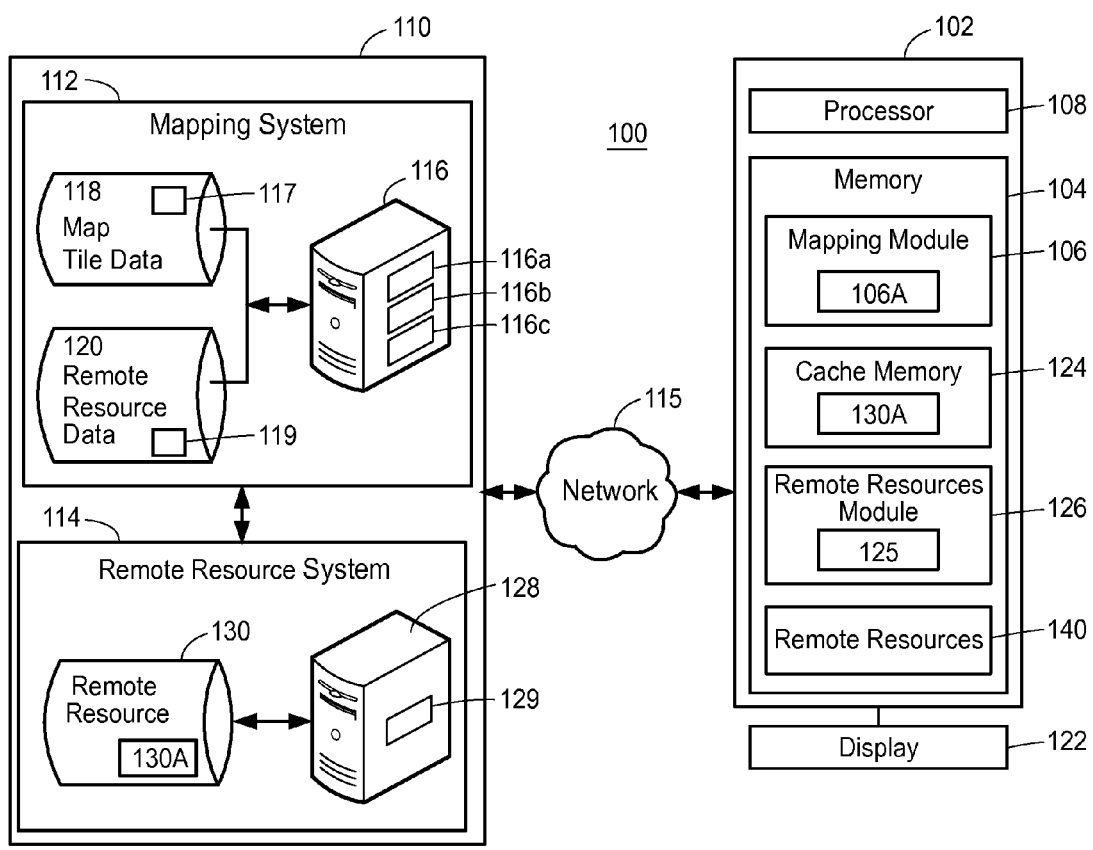
FIG. 1A is a high-level block diagram of a system for pre-fetching remote resource data for cache storage on a mobile computing device.

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Embodiments of systems and methods for efficiently transferring remote resource data that is logically linked to map data from various remote resource data servers to a client device are discussed below. To render a map image in a web browser, mapping application, or another application, the client device may request map data from the map server via a communication network, and the map server in response may provide vector data that allows a mapping application executing on a mobile computing device to render map graphic content as well as remote resource data that describes other graphic content of the rendered vector data. More particularly, vector data may specify various geometric shapes (e.g., using mathematical descriptions) for map features and indicate how these shapes should be positioned for rendering various map features such as roads, buildings, parks, bodies of water, etc. on the client computing device. Remote resource data may include graphic representations of common map items such as tree symbols, road shields, smart map icons, etc., that may be commonly found on a wide variety of maps. The map server or the client may also specify which visual styles the client device should apply to various vector-based descriptions of map features as well as the remote resource bitmaps.

A computer-implemented method may pre-fetch place remote resource data to a mapping application executing on a client computing device from various remote resources for subsequent display on the client computing device. The method may comprise analyzing a standard remote resources listing, a user's historic uses of a mapping application, preferences, or other data to determine which remote resources to store in a cache memory of a mobile computing device. The remote resource data may include data to render graphic representations of items that are commonly depicted on maps. For example, maps may be rendered in mobile computing devices using vector-formatted data sent from a backend mapping system. Rather than sending a completely rendered map image to the mobile device, a portion of the data within the vector may be data and instructions to cause a mapping application executing on the mobile computing device to "rasterize" or render the map image upon arrival at the device. Sending vector data reduces data transmission latency over sending a fully-formatted map image.

Vector data to render the map using instructions of the mobile device mapping application may be useful when describing graphic items that are not consistent across the entire map image. For example, vector data may describe a number of roads with turns and various changes across the map. However, some map items are consistently repeated across the map and are more easily transmitted as complete images, rather than data that causes the mobile device mapping application to render vector data multiple time. For example, sending vector data may be most efficient to illustrate how a road changes across a map image, but sending vector data to describe each instance of a road shield in a map image may be significantly less efficient. Thus, data transmission latency may be reduced if map data is sent to a mobile computing device using a combination of instructions for the mapping application to rasterize some portions of the map and graphics to render other portions of the map that consistently repeat within the image.

Remote resource data in the form of consistently repeated graphic map items may be separately pre-fetched or pre-downloaded via a network connection before it is requested by the user so that this remote resource data is available independent of all or some of the memory burden of accompanying map tile data. For example, data logically associated with the digital map data may include label or icon data for the various buildings, roads, and other graphic elements of the map. Other data may include remote resource data that provides commonly understood graphic representations of common map items such as road shields, mass transit symbols, park symbols, and other graphic items. Remote resource data may be requested separately or at the same time as other, vector-based graphic elements of a map from various remote resource data servers via a network connection between a mobile computing device and the server. This remote resource data may then be stored in a cache memory of the mobile computing device (i.e., an in-memory cache, an on-disk cache, etc.). The remote resource data may then be available at times of low connectivity between the mobile device and the server.

In some embodiments, a user map search history, a list of standard map icons, or other information may be retrieved and analyzed to determine locations for remote resource data that may be useful for the user. The remote resource data may be pre-fetched to the mobile device, either at the request of a remote resource module at the mobile device or pushed to the mobile device by a backend server. Further, an analysis of user activity, system-wide mapping search histories, or other analyses may determine one or more graphic items that are likely to be needed to render a map. This analysis may be performed at the backend or the mobile device and may consider all, or portions of, data related to the user's geographic interests, a standard list of common graphic items, use histories, or combination of data. In some embodiments, the system may use data related to where the user spends most of his or her time, map searches the user has performed via a mapping modules, trips the user has planned, a listing of standard map icons and their sources, and the like.

FIG. 1A is a high-level block diagram that illustrates a system 100 for pre-fetching mapping system data, including remote resource data, for storage in cache memory. Generally, the client mobile computing device 102 may include a memory 104 storing a mapping module 106 that is executed by a processor 108. The mapping module 106 may include instructions to pre-fetch remote resource data from a backend server based on an analysis of a standard map icon list, user mapping module usage, and other data. The computing device 102 may include a smart phone, a tablet computer, a personal computer, or other computing device including a mapping module 106 and capable of executing the various modules, instructions, etc., described herein. The mapping module 106 may communicate with backend components 110 including a mapping system 112 and various remote resources 114 via a network connection such as the Internet 115 or other type of networks (e.g., LAN, a MAN, a WAN, a mobile, a wired or wireless network, a private network, or a virtual private network, etc.). While the system 100 is illustrated in FIG. 1A as including remote resources as a backend component, the components and functions of the remote resources described herein may also be communicatively coupled to the computing device 102 via a local network.

A mapping system server 116, which may be in the form of one or more servers, may send and receive map tile data 117 from a map tile data repository 118, and a remote resource data list 119 from a remote resource data repository 120 that identifies common graphical features of the map tile data 117. In some embodiments, the mapping system 112 and the system server 116 may send computer-executable instructions and data to allow the mapping module 106 to render a digital map in a display component 122 of the client device 102. While using the mapping module, 106, a user may cause instructions of the module to be executed to show his or her location, perform a map search or other action using the mapping module 106. User actions with the module may build a user mapping history 106A that describes past locations the user has been, searches the user has performed, interests, favorite restaurants, locations, etc. For example, after a map search result is returned to the device 102 (as described below), a user may cause the mapping module 106 to execute instructions to flag a particular location (e.g., address, map feature, GPS point, etc.) within the returned search result as a "favorite" or otherwise indicate that a particular map location is preferred by the user. Geographic locations for which the user has indicated a preference (e.g., mapping module search results favorites, hometown, favorite cities, planned trips, etc.) may be collected at the device 102 and instructions of the mapping system 112 may be executed to build a mapping module history 106A indicating locations at which the user is likely to request data from the mapping server 116.

In some embodiments, a remote resource data list 125 may be determined at the client device 102 or retrieved and "pulled" from various sources. The remote resource data list 125 may indicate the common remote resources that a user needs to fully render a map at the device 102. For example, a remote resources module 126 may execute instructions to determine or collect resource identifications or references corresponding to remote resources that are typically displayed on maps at the client computing device 102 (e.g., from the mapping history 106A). The remote resource data list 125 may also be collected from a variety of applications and modules executing on the client device 102 or in communication with the device 102 (e.g., a mapping application, a web browser, a user activity tracking module, a trip planning module, an email module, a social networking system, etc.) and stored in a remote resources data module 126. The data 125 may include a list of remote resource locations (e.g., uniform resource locators or URLs) for graphical resources that typically appear within maps that are rendered on the device 102 (e.g., an urban user may render maps with mass transit and highway shield icons much more often than a rural user). The data may also include common icons associated with favorite locations a user saves during execution of a mapping module 106, a list of remote resources that is standard for all users of the mapping module 106 and maintained in a backend component, etc. The remote resources list 125 may also be analyzed at the client device 102 to determine a user's geographic and personal interests to determine common graphical features 119 that may be pre-fetched and stored in a cache memory of the device 102 for later use by the mapping module 106 when rendering a map that includes those features.

In another embodiment that determines remote resources data at the backend 110, remote resources data 130A may be collected from various online resources 130 and "pushed" to the client device 106. The remote resources data 130A may be collected from a variety of online resources 130 linked to the mapping system 112. For example, a backend server 128 may include a module 129 with instructions that, upon execution, collect information related to the location of remote resources 130A as indicated in a remote resource data list 119. Remote resource data 119 may then be pre-fetched from a remote resource data repository 120 or the various repositories 130 for the graphic items that are consistently repeated across maps and that are likely to be rendered by the user at the mobile device 102. Those resources 130A may then be displayed to a user during a period of low connectivity to the mapping system 112 or at any other time. Other embodiments may determine remote resource data 130A for cache storage at a user's mobile device using a combination of front end 102 and backend 110 components.

In response to a request from a client computing device 102, the mapping system 112 may process and send graphics, text, and other data for a map image to be displayed on a client computing device 102. A client device 102 request may also cause the mapping system 112 to send remote resource data 130A that may be displayed with the graphic map tile data 117 or be linked to the displayed map tile data 117. The graphic components (i.e., map tile data 117, remote resources data 130A) and text or other data may be processed and sent to the device 102 together or separately. When the client computing device 102 requests data 117, 130A from the mapping system 112, the system 112 may generate each map tile 117 with or without remote resource data 130A according to a vector graphics format. The client device 102 (e.g., a mobile phone, tablet computer, etc.) may locally rasterize the vector data corresponding to each map tile for display at the device 102.

In an embodiment, the system 100 retrieves the requested data from various servers. For example, the mapping system server 116 may include a processor 116a and a computer-readable memory 116b that stores a map controller 116c in the form of computer instructions, for example, that may be executable on the processor 116a directly (e.g., as compiled code) or indirectly (e.g., as a script interpreted by another application executing on the processor 116a). The computer-readable memory 116b may include volatile memory to store computer instructions and data on which the computer instructions operate at runtime (e.g., Random Access Memory or RAM) and, in an embodiment, persistent memory such as a hard disk, for example. In an embodiment, the map controller 116c includes a dynamic feature controller 154 (FIG. 1B) that generates vector data for various map elements that are provided as map content to the client device 102. As used herein, a map feature (or simply feature) may correspond to an individual map element such as a building or an aggregation of several map elements such as several buildings, a park, and several pedestrian paths of a college campus. In general, a map feature may be described using vector data. Remote resource data 130A may include graphic elements that are consistently and repeatedly displayed within a map such as road and highway shields, trees, public transportation indicators, business type indicators (e.g., a restaurant location may display an image of a crossed fork and knife, a bank may display an image of a dollar sign, etc.).

In some embodiments, the mapping module 106 receives data that specifies both graphical characteristics of map features as well as remote resource data 130A or references to the remote resource data 130A that includes images of the consistently repeated elements of a map in response to a request for mapping data from the remote mapping system 112. The received data may include vector data that specifies the map features as geometric shapes using mathematical descriptions of points and paths connecting the points. For example, rather than specifying each pixel that makes up a raster image of a line segment, vector data may specify the two endpoints of the line segment and indicate that the two endpoints are connected by a straight line. The mapping module 106 then may apply style and other data as appropriate to the specified line segment, so that the line segment is displayed with a particular title, description, etc. As another example, the vector data may specify the contour of a building, and corresponding text data may specify the name, description, web page, contact information, address, etc., of the building. In other words, rather than receiving raster images from the map server 116, the mapping module 106 may receive instructions for drawing a map image on an output device 122 of the client computing device 102 and execute the instructions to generate a raster map image.

In some cases, however, data received in response to a mapping system request may include raster images (e.g., bitmaps, JPEGs, etc.) or references to raster images (e.g., a URL to a bitmap of a standardized highway road shield from a governmental or road safety server) as certain component elements that cannot be easily represented in a vector format or are more suitable to be formatted as a URL within the vector that points to a raster image remote resource. As described above, a remote resource data list 119 may include types and locations of remote resources that may be included within data from the mapping system 112 or another remote resource that sends map tile data to the mobile computing device 102. For example, the remote resource data list 119 may include a URL to a consistently repeated raster image of a highway shield. The URL may point to a federal highway server that maintains standard images for such shields. The URL may also point to images maintained as a resource of the mapping system 112. For example, the mapping system 112 may maintain raster images for the consistently repeated graphics for mapping system requests, as described herein.

For simplicity, the client device 102 is illustrated with a single processor 108 to execute various modules stored in the device memory 104, as described herein. The client device 102 in other embodiments may include additional processing units (not shown) such as a graphics processing unit (GPU) configured to facilitate image rendering on the output device 122, for example. Further, the mapping module 106 may utilize a library of graphics functions for efficiently generating a map image as well as remote resource data 130A. For example, the memory 104 may store a plugin, such as an OpenGL® or Direct3D® library, having functions for rendering graphics which various applications executing on the client 102, including the mapping module 106, may access via an application programming interface (API). In another embodiment, the memory 104 stores a plugin particularly suitable for browser applications, such as WebGL®, for example. Also, in some embodiments, the memory 104 stores additional software components that facilitate efficient rendering of images and remote resource data 130A via the output device 122. For example, the memory 104 may store an Adobe® Flash® plugin or an O3D plugin.

Figure 1B:
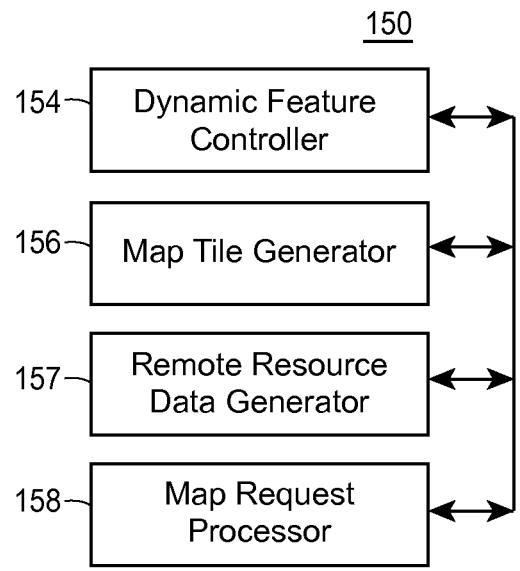
FIG. 1B is a high-level block diagram of a component of the system for pre-fetching remote resource data to a mobile computing device.
Figure 1C:
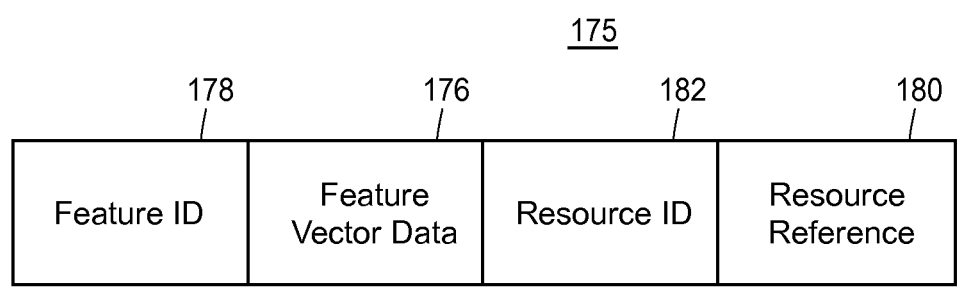
FIG. 1C is a high-level block diagram of another component of the system for pre-fetching remote resource data to a mobile computing device.

With reference to FIGS. 1B and 1C, a map controller 150 may include various functions and operate as a module in the memory of the client computing device 102 or in the server 116 of FIG. 1A, for example, or the various functions may be split among the client computing device 102 and the server 116, as described above, to format, receive, and process requests for mapping data from the system 112, and return the data to a client computing device. According to an embodiment, the map data controller 150 is implemented as a set of instructions that are stored on a computer-readable medium and executable on one or more processors. For example, referring back to FIG. 1A, the map data controller 150 and its various functions may be distributed among the memories 116b, 104 and processors 116a, 108.

According to an embodiment, the map controller 150 includes a dynamic feature controller 154, a map tile generator 156, a remote resource data generator 157, and a map request processor 158. The map request processor 158 may be configured to process requests from client devices, such as the client device 102, for map data 117 and/or remote resource data 130A corresponding to specified or user preferred geographic regions. Each request may correspond to a single electronic message or a series of electronic messages, depending on the scenario and/or embodiment. For example, the map request processor 158 may receive a request for map data corresponding to a two-mile-wide region centered at latitude 41° 52′ 43″ and longitude −87° 38′ 11″. The map request processor 158 may also receive a request for remote resource data 130A corresponding to consistently repeated graphic elements within maps requested from the system 112 generally or from a user, specifically. The map request processor 158 may receive a request for map data that includes feature data in a vector format and remote resource data 130A in a single electronic message, e.g., a single HTTP message, or in separate electronic messages. For example, an HTTP message 175 may include data for a map feature 176 (e.g., a road, building, park, etc.) that corresponds to a feature identification 178 as well as a resource reference 180 (e.g., a URL) that corresponds to a resource reference ID 182.

After the map request processor 158 receives a request for map data 117 including from a client device, the map controller 150 provides appropriate data to the client device via one or more electronic messages 175. In some embodiments, the map request processor 158 may include instructions to determine what type of data is being requested and execute a function call to one or more of the map tile generator 156 or the remote resource data generator 157 to retrieve the requested data from the appropriate data repository 118, 120, 130. The map tile generator 156 may include instructions to generate map data as a set of map tile descriptors, such that each map tile descriptor describes a map tile, i.e., a portion of a map image of a certain size (e.g., 256 by 256 pixels). The size of a geographic region represented by an individual map tile depends on the zoom level with which the map tile is associated, so that a single map tile at a lower zoom level illustrates a larger geographic area than a single map tile at a higher zoom level. The map tile generator 156 may generate each map tile descriptor according to a vector graphics format, and a client device, such as the client device 102 of FIG. 1A, may locally generate a raster image for each tile. The map tile generator 156 may retrieve the requested data from a map database such as the map tile database 118. Similarly, the remote resource data generator 157 may retrieve remote resource data 130A in conjunction with the response to the request for map data. In some embodiments, the remote resource data generator 157 includes instructions to determine remote resource data 130A from a remote resource data listing 119, retrieve the remote resource data 130A corresponding to one or more entries on the listing 119, and push or pull remote resource data 130A from one or more data repositories 120, 130. In other embodiments, the remote resource data generator 157 includes instructions to determine a resource reference (e.g., a URL) for remote resource data 130A from the remote resource data listing 119, and push or pull the resource reference from the listing to the client device 102 where the client device executes another instruction to retrieve the remote resource data 130A from the backend repositories 130. The remote resource data generator 157 may also include instructions to push or pull remote resource data 130A that corresponds to one or more of the requested geographic region or a map search history 106A along with the data referenced by the listing 119. For example, where user history data or other data indicates that the user typically requests map tile data for urban areas, the map request processor 158 may employ the map tile generator 156 and the remote resource data generator 157 to push/pull remote resource data 130 corresponding to consistently repeated remote resource data 130A for urban areas. Likewise, the system 100 may push/pull remote resource data 130A to the computing device 102 according to the remote resource data list 125.

When providing graphic map data to a client device, the map controller 150 may separate map tile data 117 from remote resource data 130A. In some cases, the map controller 150 may provide vector data that describes map content without providing the corresponding remote resource data 130A to the client device at the same time (if, for example, the client device already has the necessary remote resource data) or, conversely, may provide remote resource data 130A without providing the vector data in satisfaction of a specific request for graphical map content to which the remote resource data 130A applies (for rendering a geographic region at a more detailed zoom level and using remote resource data 130A that was sent with a previous request for the geographic region at a different zoom level, for example). Further, in some scenarios, the map controller 150 provides vector data and remote resource data 130A at the same time (e.g., in a same electronic message or a series of electronic messages). For example, when the map request processor 158 receives a request for map data and queries the map data repository 118 for map tile data 117, the remote resource data generator 157 may query the remote resource data repositories 120, 130 for remote resource data 130A that corresponds to the geographical area of the requested map tile data 117. As with the map tile data 117, the amount of remote resource data corresponding to the requested map data 117 may depend on the zoom level with which the map tile is associated. For example, a single map tile at a lower zoom level illustrates a larger geographic area and, thus, corresponds to more remote resource data 130A than a single map tile at a higher zoom level. In some embodiments, the remote resource data generator 157 may query the remote resource data repository 120, 130 for only the data 130A that is visible at the zoom level of the requested map data 117. In other embodiments, the remote resource data generator 157 may query the repository 120, 130 for more data that corresponds to other zoom levels than would be visible at the zoom level of the requested map data 117. Furthermore, the remote resource data generator 157 may query the repository 120, 130 for data that corresponds to expressed or predicted user interests before the data is explicitly requested by a user. The remote resource data generator 157 may then insert the retrieved remote resource data 130A in the vector containing the requested map tile data 117 or may send the data 130A separately from the map tile data 117. The client device 102 may locally rasterize the vector data for each tile including the data 117 and store the retrieved remote resource data 130 in a cached memory 124 of the device 102.

The dynamic feature controller 154 may be communicatively coupled to the map tile generator 156 and remote resource data generator 157 and configured to determine which map elements are associated with the requested map data and generate vector-based or other descriptions of these map elements. For example, the dynamic feature controller 154 may determine that, in response to a request for map data corresponding to zoom level Zi for a certain geographic region, vector descriptors corresponding to interstate highways, large bodies of water, etc. must be generated, whereas in response to another request for map data corresponding to zoom level Zj for the same geographic region, additional vector data corresponding to local roads and buildings must be generated along with additional remote resource data 130A corresponding to a larger-area view of the map. Further, in some cases, the dynamic feature controller 154 generates different sets of vector data and remote resource data 130A for different map types. For example, a terrain map may include map elements that are not included in a basic map for the same geographic region and zoom level.

In some embodiments, the remote resources system 114 (FIG. 1A) may include a remote resources system server 128 that includes a module 129 with instructions executable by a processor to receive or retrieve a remote resources data list 119 from the mapping system 112 or a user mapping history 106A from the device 102. The remote resources data list 119 may indicate locations or sources for remote resources data 130A. For example, the remote resources module 126 may be in communication with the mapping system 112. At periodic intervals (e.g., daily, weekly, etc.) or when the list 119 is updated at the mapping system 112, the list 119 may be pushed to the device 102 from the system 112. The remote resources module 126 may then execute instructions to retrieve the resource data 130A from the resources 130 and store the data 130A in a cache memory 124 for future use by the mapping module 106. In other embodiments, the mapping system 112 may respond to requests for mapping system data from the computing device 102 with messages 175 including both feature data 176 and resource references 180. The remote resources module 126 may then execute instructions to retrieve and store the resource data 130A, as described herein. In still other embodiments, the mapping system 112 may use the list 119 at the backend to retrieve the data 130A from the resources 130 to periodically push the remote resource data 130A to the remote resources module 126 for storage in the cache memory 124.

Figure 2A:
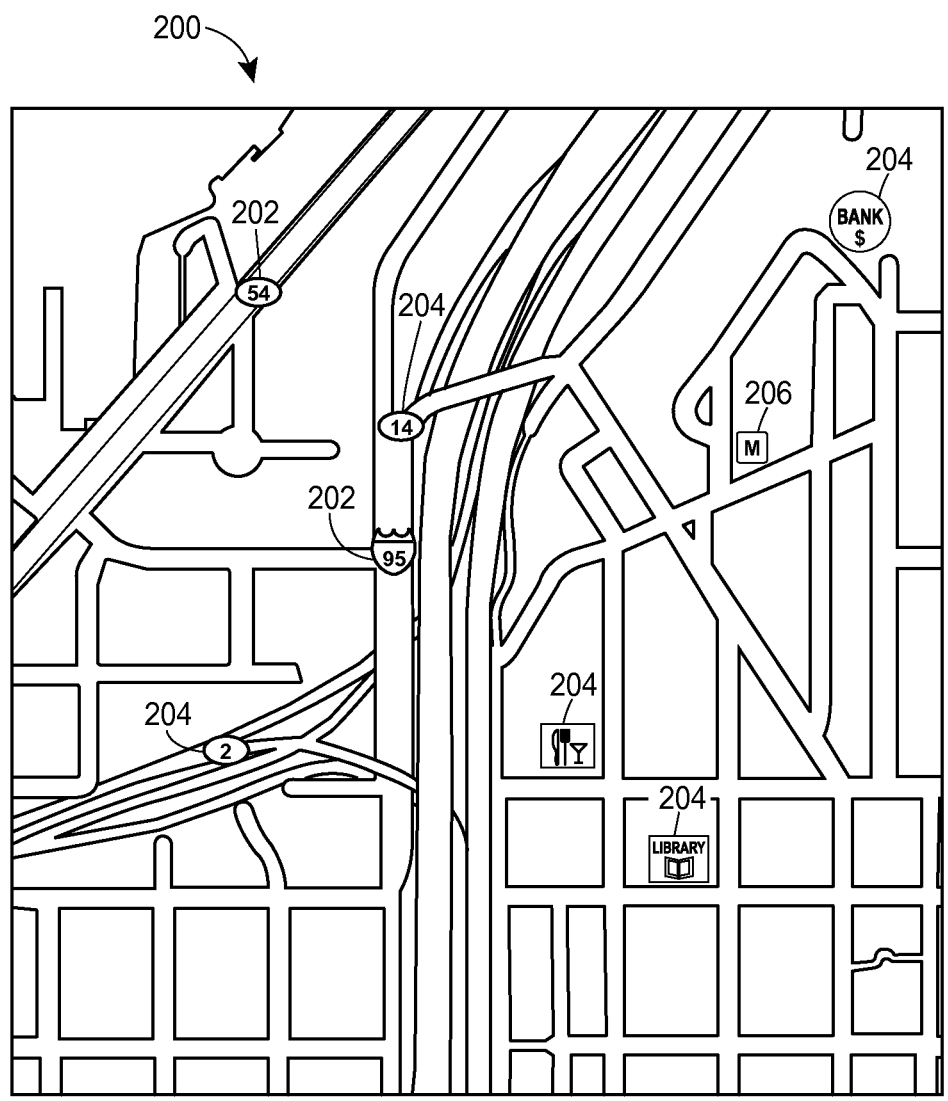
FIG. 2A is an exemplary map generated by the system for pre-fetching remote resource data to a mobile computing device using vector data and remote resource data.
Figure 2B:
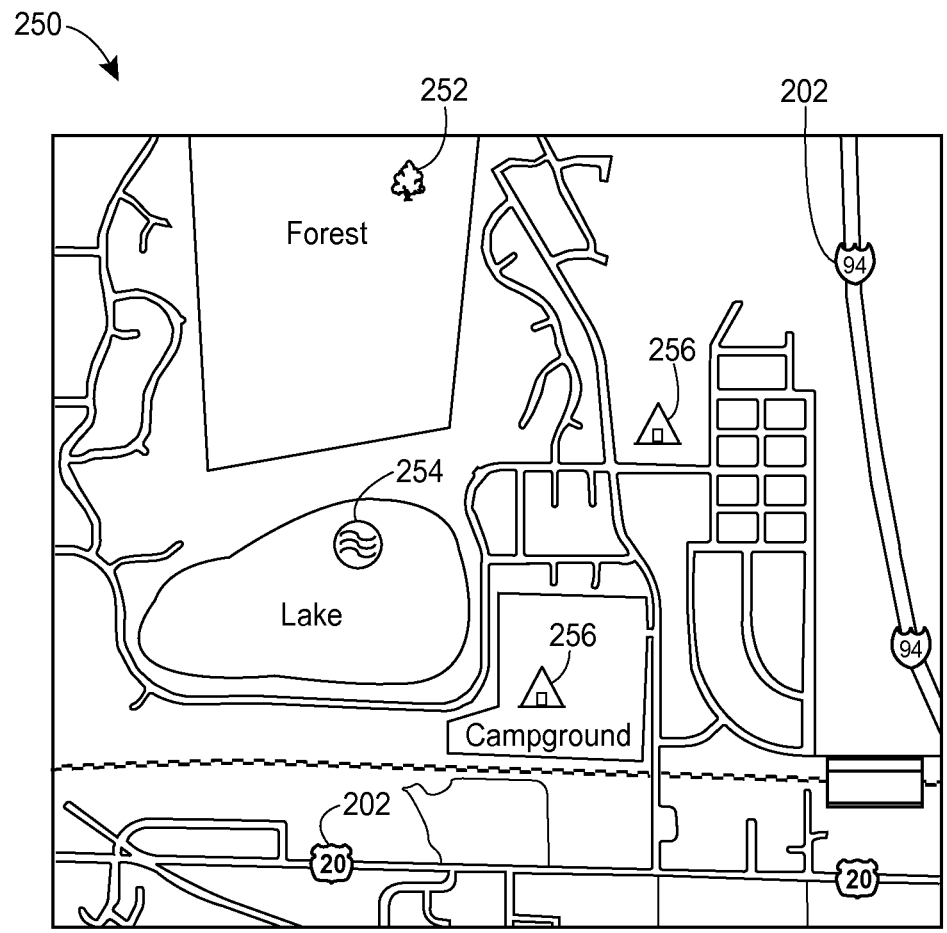
FIG. 2B is another exemplary map generated by the system for pre-fetching remote resource data to a mobile computing device using vector data and remote resource data.

In further embodiments, the remote resources module 126 or the remote resources system 114 may periodically analyze a mapping module history 106A to determine remote resource data 130A that the user is likely to need to display maps in future map searches or other uses of the mapping module 106. The module 126 may then cause the processor 108 to execute instructions to pull the data 130A from the remote resources 130 for storage in the cache memory 124. For example, with reference to FIG. 2A, where the system 100 determines that the user will likely request data for urban areas, the module 126 may pull remote resource data 130A corresponding to more urban graphic objects for an urban map 200 (e.g., road shields 202, highway exit indicators 204, business indicators 204, mass transit indicators 206, landmarks, etc.). Similarly, with reference to FIG. 2B, where the system 100 determines that the user will likely request data for rural areas, the module 126 may pull remote resource data 130A corresponding to more rural graphic objects for a rural map 250 (e.g., trees, lakes, camping indicators, etc.).

Figure 3:
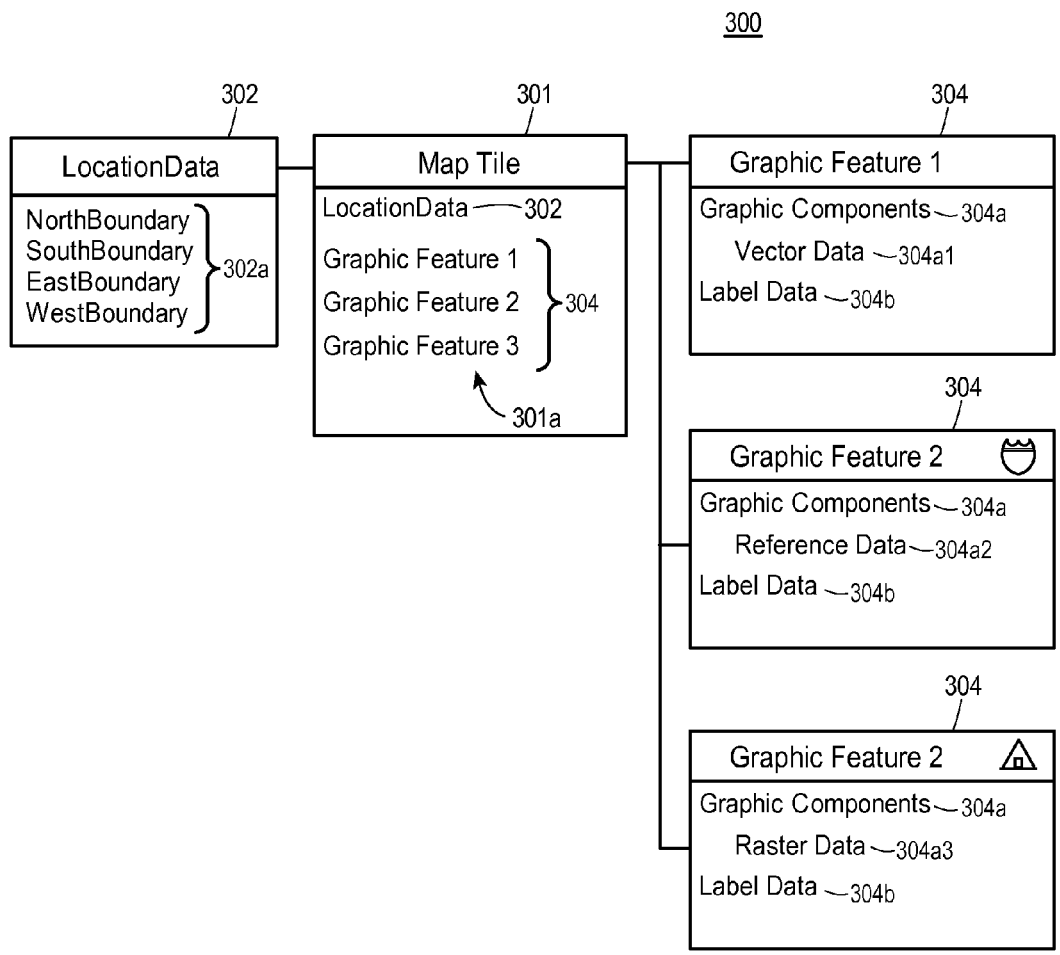
FIG. 3 is an exemplary block diagram of a data structure for the system for pre-fetching remote resource data to a mobile computing device.

FIG. 3 illustrates one embodiment of a high-level block diagram for remote resource data corresponding to a map displayed at a user's computing device 102. A map may be made up of mapping data 300 including several map tiles 301 that are each sent to the user's device 102 in response to a search query or other function of the mapping module 106. The device 102 may receive the mapping data 300 in either a push or a pull data transaction. Each tile 301 may include a plurality of attributes 301a, for example, location data 302, and several graphic features 304 including graphic components 304a and label data 304b. The graphic components 304a may include data used by the mapping module to render images of various roads, buildings, points of interest, road shields, park and mass transit indicators, etc. The label data 304b may include text to label each corresponding feature 304. In some embodiments, the graphic components 304a include vector data 304a1 for roads, buildings, points of interest, etc. that may be rasterized by the mapping module 106 of the device 102. The graphic components may also include reference data 304a2 or raster data 304a3 for road shields, camping indicators, and other images that are consistently repeated graphic components displayed within a map image, as described herein.

The mapping data 300 that makes up a raster image of a complete map (i.e., a map image including the rasterized vector data, the remote resource data, and the raster data) on a client computing device may be logically linked among various data sources. For example, map tile data 117 stored within the map tile data repository 118 may be logically linked to the various mapping data 300, for example, the remote resource data 130A of the remote resource data repository (or repositories) 130. In some embodiments, a first feature 304 including a graphic component 304a described by vector data 304a1 may be logically linked to a second feature 304 including a graphic component 304a described by a reference to remote data 304a2 and/or a raster image 304a3. For example, a map tile feature 304 of a road that is described by vector data 304a1 may be logically linked to a road shield (e.g., US 95, etc.) that is described by a reference to remote data 304a2 or a raster image 304a3. Once the system resolves the reference data 304a2 or receives the raster data 304a3, the reference data 304a2 (or a raster image corresponding to the reference) and the raster data 304a3 may be stored in cache memory 124. Thus, if a subsequent request for mapping data 300 may satisfied by map tile data 301 including features 304 described by vector data 304a1 that corresponds to reference 304a2 or raster 304a3 data that was previously stored in the cache 126, the module 106 may retrieve the cached data without further communication between the remote mapping system 112 and the client computing device 102.

The location data 302 may include particular coordinates 302a that describe the specific geographic location of the map tile 300 that represents a geographic area. In some embodiments, the location data 302 includes a plurality of boundaries 302a such as a north, south, east, and west boundary for the map tile 300. The location data 302 may include latitude and longitude coordinates as determined by a global positioning system (GPS) or other system that is able to determine where the geographic location or physical object is located.

Figure 4A:
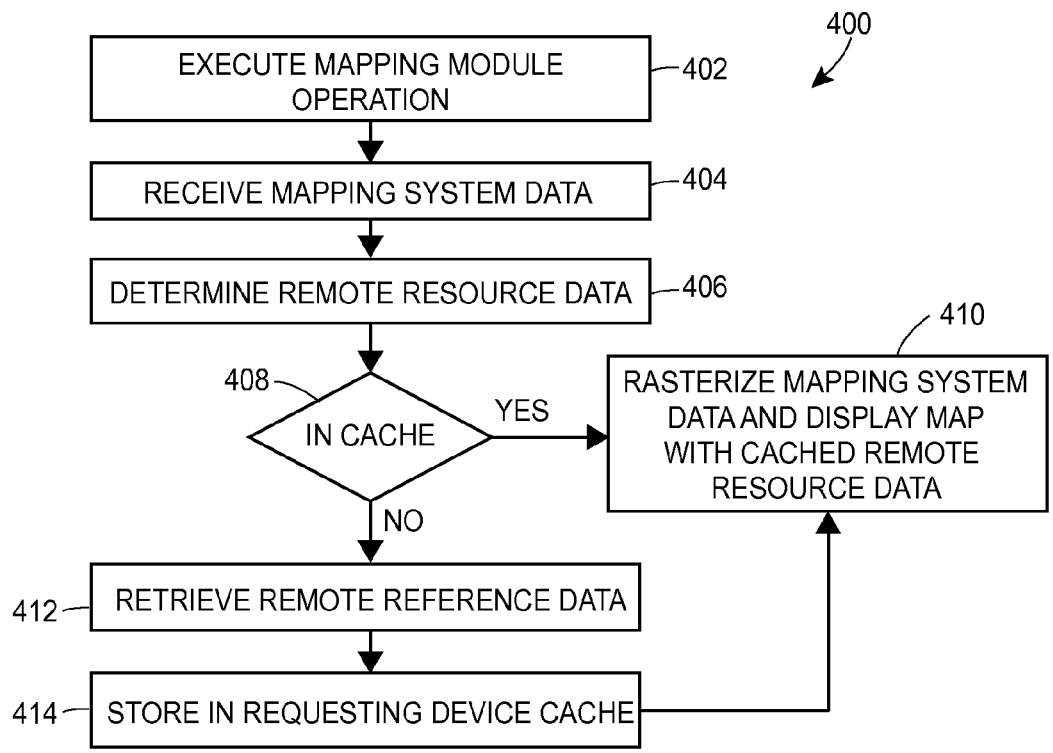
FIG. 4A is an exemplary flow chart of a method for pre-fetching remote resource data from various remote sources, as described herein.

FIG. 4 is a flow diagram of an example method 400 for pre-fetching remote resource data 130A for storage within a cache memory 124 and subsequent display on a client device 102 in response to a user-initiated mapping module operation (e.g., search, routing between geographic locations, etc.). The method 400 may include one or more blocks, modules, functions or routines in the form of computer-executable instructions that are stored in a tangible computer-readable medium and executed using a processor 108 of the client device 102 (e.g., a smart phone, tablet computer, or a mobile computing device, or other personal computing device, as described herein) or one or more servers 116, 128. The method 400 may be included as part of any modules of a computing environment for a system 100 for pre-fetching remote resource data 130A, for example, or as part of a module that is external to such a system. For example, the method 400 may be part of a backend map controller 116c, a remote resources system module 129, a frontend remote resources module 126, or a mapping module 106. The method 400 may execute at either the frontend 102 or backend 110. Further, a user may activate or disable one or more options to allow or prohibit the system 100 to collect or send user data (e.g., a mapping module history 106A) or to receive push or pull notifications as part of this method 400 or any part of the system 100. For example, a user interface of the mapping module 106 may allow a user to opt-in or opt-out of any data collection as described herein. FIG. 4 will be described with reference to FIGS. 1A, 1B, 2A, 2B, and 3 for ease of explanation, but the method 400 may of course be utilized with other objects and user interfaces.

At block 402, the mapping module 106 of the user device 102 may execute an operation. For example, the module 106 may execute a function call to the mapping system 112 to execute a search, routing, or other operation to cause a message 175 to be sent to the device 102 with is then processed by a mapping module 106 to display a map within a display component 122 of the device 102. Once the mapping system 112 receives the function call via the network 115, the system 112 may execute instructions to retrieve mapping system data to fulfill the received request. In some embodiments, the mapping system 112 builds a message 175 including feature vector data 176 and a resource reference 180 in response to the request.

At block 406, the method 400 may determine the remote resource data 130A. In some embodiments, the block 406 may include instructions that cause the mapping module 106 to use the feature vector data 176 to rasterize a map feature. At block 408, the module 106 may use the resource ID 182 and/or the resource reference 180 to determine if resource data 130A corresponding to the ID 182 and/or reference 180 is stored in cache memory 124 of the device 102. If the data 130A has been previously stored in the cache memory 124, then block 410 may cause instructions to be executed to rasterize the feature vector data 176 and display the map with the data 130A from the cache 124. If the data 130A is not in the cache 124, then block 412 may cause instructions to be executed to retrieve the data 130A from the remote resources system 114 or another remote resource. Once retrieved, block 414 may cause instructions to be executed to store the remote data 130A in the cache memory 124, rasterize the feature vector data 176, and display the map with the remote resource data 130A that was stored in the cache 124.

Figure 4B:
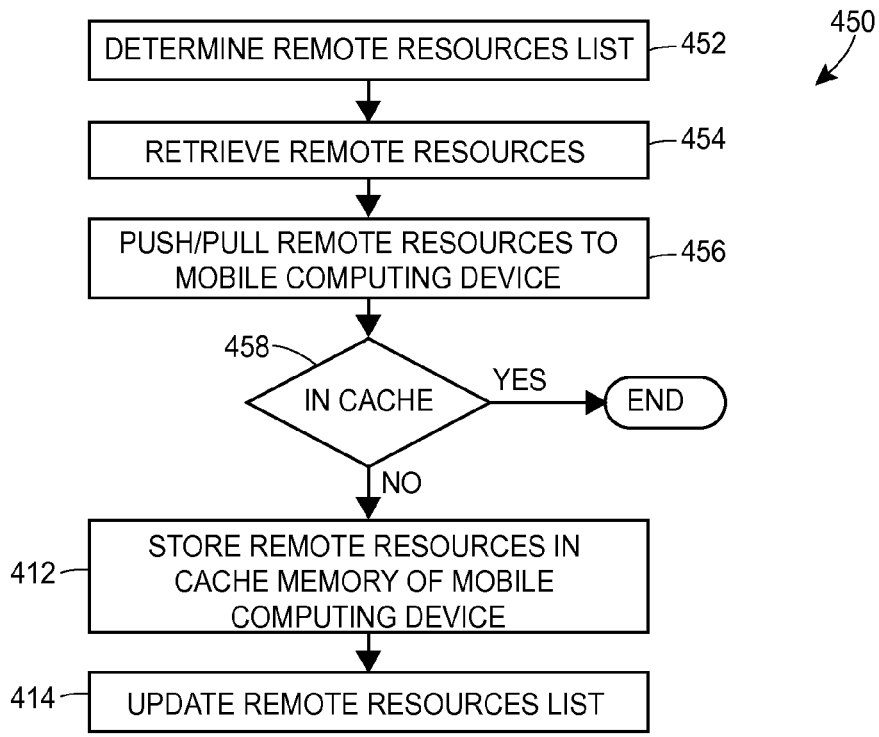
FIG. 4B is an exemplary flow chart of another method for pre-fetching remote resource data from various remote sources, as described herein.

With reference to FIG. 4B, another method 450 may determine the remote resource data 130A and push or pull the data 130A to the device 102 for future use by the module 106 in response to a periodic push/pull operation rather than a specific search or other user-initiated mapping module operation. At block 452, a frontend or backend component may determine the references of a remote resources list 119.

In some embodiments, a remote resource module 126 on the mobile device 102 may query the backend mapping system 112 for a remote resources data 119 list at block 452 and resolve references on the list 119 to retrieve remote resource data 130A to the device 102 at block 454. For example, the mapping system server 116 may receive a request for the list 119 and execute instructions to send the list 119 itself or one or more references from the list 119 to the device 102 at block 452. The device may then use the references to execute further instructions to request the remote resources data 103A from the various remote repositories 130 of the remote resources system 114 at block 454. The device 102 may, thus, pull the data 103A to the device 102 at block 456. In further embodiments, the mapping system server 116 may receive a request for the list 119 and execute instructions to resolve each reference on the list 119 at block 452. The backend server 116 may then execute further instructions to retrieve the remote resources data 103A from the various remote repositories 130 of the remote resources system 114 at block 454. Thus, the server 116 may push the data 130A to the device at block 456.

Whether the data 130A is pushed or pulled to the device 102, the device may execute instructions to determine whether the data 103A was previously stored in the cache 124 at block 458. In some embodiments, the module 106 may use a resource ID 182 and/or a resource reference 180 to determine if resource data 130A corresponding to the ID 182 and/or reference 180 is stored in cache memory 124 of the device 102. If the data 130A has been previously stored in the cache memory 124, then the method 450 may end. When the stored data 130A is needed for a future search or other operation using the mapping module, then the mapping module 106 may retrieve the data 130A from the cache 124. If the data 130A is not in the cache 124, then block 460 may cause instructions to be executed to store the data 130A in the cache 124 for future use by the mapping module 106. At block 462, the method 450 may cause instructions to be executed for updating the remote resources list 119 or another listing to indicate that the retrieved data 130A has been stored in the cache 124.

Figure 5:
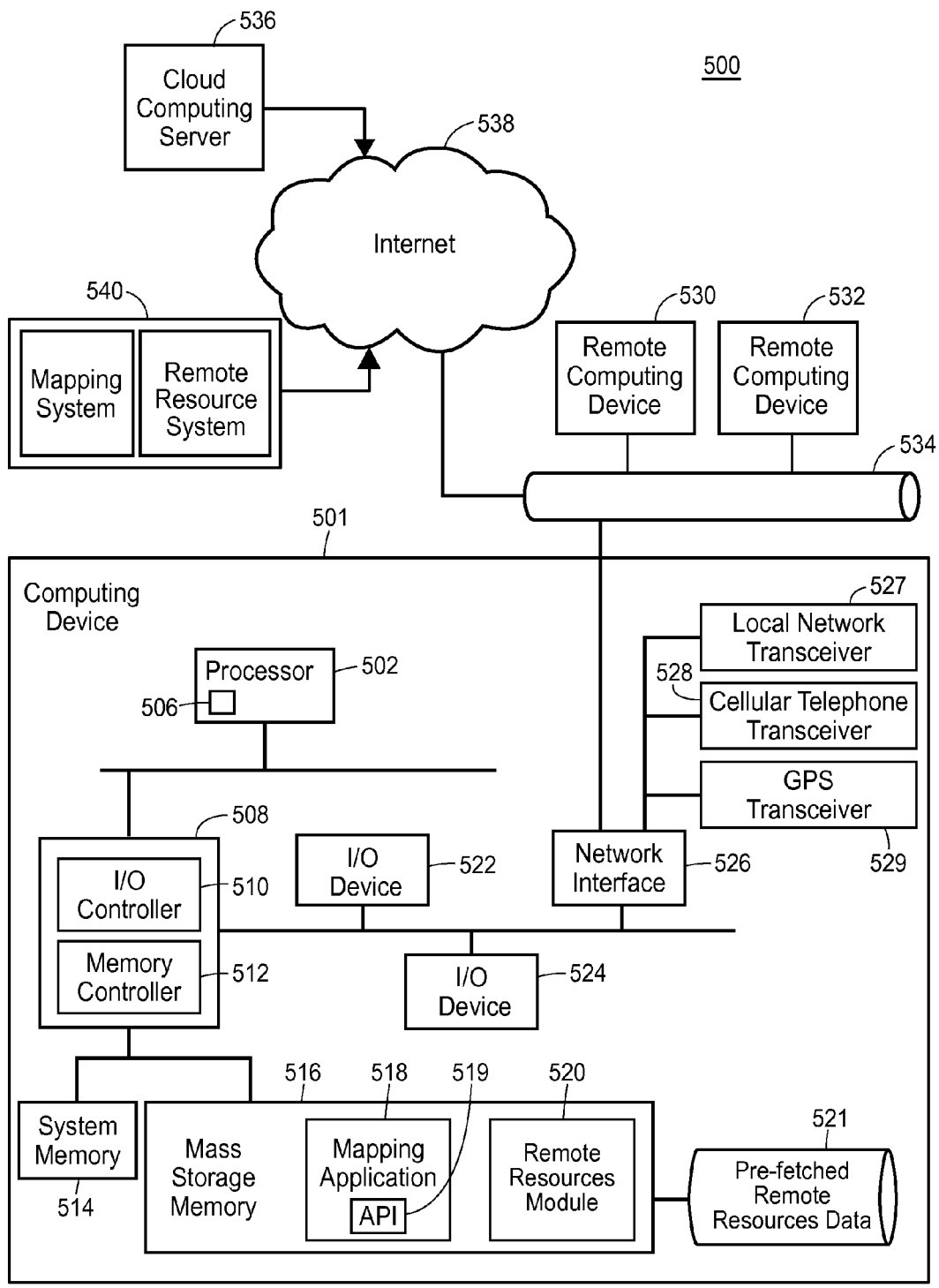
FIG. 5 is high-level block diagram of a computing environment that implements a system and method for pre-fetching remote resource data for cache storage and display on a computing device.

FIG. 5 is a high-level block diagram of an example computing environment for a mobile mapping system 500 having a computing device 501 that may be used to implement the method and systems described herein. The computing device 501 may include a mobile computing device 102 (e.g., a cellular phone, a tablet computer, a Wi-Fi-enabled device or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example mobile mapping system 500 may be used to implement and execute the example system of FIG. 1, the data structures of FIGS. 2 and 3, the method of FIG. 4, and the like. Although the example mobile mapping system 500 is described below as including a plurality of peripherals, interfaces, chips, memories, etc., one or more of those elements may be omitted from other example processor systems used to implement and execute the example system 100 to pre-fetch remote resource data. Also, other components may be added.

As shown in FIG. 5, the computing device 501 includes a processor 502 that is coupled to an interconnection bus 504. The processor 502 includes a register set or register space 506, which is depicted in FIG. 5 as being entirely on-chip, but which could alternatively be located entirely or partially off-chip and directly coupled to the processor 502 via dedicated electrical connections and/or via the interconnection bus 504. The processor 502 may be any suitable processor, processing unit or microprocessor. Although not shown in FIG. 5, the computing device 501 may be a multi-processor device and, thus, may include one or more additional processors that are identical or similar to the processor 502 and that are communicatively coupled to the interconnection bus 504.

The processor 502 of FIG. 5 is coupled to a chipset 508, which includes a memory controller 510 and a peripheral input/output (I/O) controller 512. As is well known, a chipset typically provides I/O and memory management functions as well as a plurality of general purpose and/or special purpose registers, timers, etc. that are accessible or used by one or more processors coupled to the chipset 508. The memory controller 510 performs functions that enable the processor 502 (or processors if there are multiple processors) to access a system memory 514 and a mass storage memory 516, including the cache memory 124 that may include either or both of an in-memory cache (e.g., a cache within the memory 514) or an on-disk cache (e.g., a cache within the mass storage memory 516).

The system memory 514 may include any desired type of volatile and/or non-volatile memory such as, for example, static random access memory (SRAM), dynamic random access memory (DRAM), flash memory, read-only memory (ROM), etc. The mass storage memory 516 may include any desired type of mass storage device. For example, if the computing device 501 is used to implement a mapping application 518 having an API 519 and a remote resource module 520 (including instructions as described by the method 400 of FIG. 4), the mass storage memory 516 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 501 and the mobile mapping system 500. Thus, a module, block, function, operation, procedure, routine, step, and method can be implemented in hardware, firmware, and/or software. In one embodiment, program modules and routines (e.g., the mapping application 518, the API 519, the remote resources module 520, etc.) are stored in mass storage memory 516, loaded into system memory 514, and executed by a processor 502 or can be provided from computer program products that are stored in tangible computer-readable storage mediums (e.g. RAM, hard disk, optical/magnetic media, etc.). Mass storage 516 may also include a cache memory 521 storing pre-fetched remote resource data, graphics, and other data for use by the mapping application 518 and remote resources module 520.

The peripheral I/O controller 510 performs functions that enable the processor 502 to communicate with peripheral input/output (I/O) devices 522 and 524, a network interface 526, a cellular network transceiver 527, a local network transceiver 528, and a GPS transceiver 529 (via the network interface 526) via a peripheral I/O bus 528. The I/O devices 522 and 524 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O devices 522 and 524 may be used with the mapping application 518 and user activity module 520 to receive GPS data from the GPS transceiver 529, send the GPS data to the backend components of the system 100, render, and display maps and user interfaces as described in relation to the figures. A cellular telephone transceiver 527 may be resident with the local network transceiver 528. The local network transceiver 528 may include support for a Wi-Fi network, Bluetooth, Infrared, or other wireless data transmission protocols. In other embodiments, one element may simultaneously support each of the various wireless protocols employed by the computing device 501. For example, a software-defined radio may be able to support multiple protocols via downloadable instructions. In operation, the computing device 501 may be able to periodically poll for visible wireless network transmitters (both cellular and local network) on a periodic basis. Such polling may be possible even while normal wireless traffic is being supported on the computing device 501. The network interface 528 may be, for example, an Ethernet device, an asynchronous transfer mode (ATM) device, an 802.11 wireless interface device, a DSL modem, a cable modem, a cellular modem, etc., that enables the system 100 for pre-fetching remote resource data to communicate with another computer system having at least the elements described in relation to the system 100.

While the memory controller 512 and the I/O controller 510 are depicted in FIG. 5 as separate functional blocks within the chipset 508, the functions performed by these blocks may be integrated within a single integrated circuit or may be implemented using two or more separate integrated circuits. The mobile mapping system 500 may also implement the mapping application 518 and remote resources module 520 on remote computing devices 530 and 532. The remote computing devices 530 and 532 may communicate with the computing device 501 over an Ethernet link 534. For example, the computing device 501 may receive mapping data created by a mapping application executing on a remote computing device 530, 532. In some embodiments, the mapping application 518 and/or the remote resources module 520 may be retrieved by the computing device 501 from a cloud computing server 536 via the Internet 538. When using the cloud computing server 536, the retrieved mapping application 518 and/or the remote resources module 520 may be programmatically linked with the computing device 501. The mapping application 518 and/or the remote resources module 520 may be a Java® applet executing within a Java® Virtual Machine (JVM) environment resident in the computing device 501 or the remote computing devices 530, 532. The mapping application 518 and/or the remote resources module 520 may also be "plug-ins" adapted to execute in a web-browser located on the computing devices 501, 530, and 532. In some embodiments, the mapping application 518 and/or the remote resources module 520 may communicate with back end components 540 such as the mapping system 112 and remote resources system 114 via the Internet 538.

Using the systems and procedures described above, the system for pre-fetching remote resource data 100 and mapping system 500 can retrieve and analyze data from a computing device corresponding to a resource that is remote from the mapping system 112. Mapping module search histories 106A, preferences, a remote resource data listing 119, user-initiated mapping module operations, or other data may be analyzed to determine references corresponding to remote resource data. The references (e.g., URLs and other references indicating a location for remote resources that are displayed within maps that are rasterized by the mapping module 106) may be resolved and data 130A corresponding to the references may be stored in a cache memory of the device 102. Of course, the systems described herein may present a user with a user interface from which the user is able to opt-out of any of the user search histories or personal preferences and remote resources data pull/push and cache storage methods described herein.

The system 500 may include but is not limited to any combination of a LAN, a MAN, a WAN, a mobile, a wired or wireless network, a private network, or a virtual private network. Moreover, while only three remote computing devices 530 and 532 are illustrated in FIG. 5 to simplify and clarify the description, it is understood that any number of client computers are supported and can be in communication within the system 500.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments of a system for pre-fetching remote resource data for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for a system and a process for pre-fetching remote resource data for subsequent display on a mobile computing device through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method, the method comprising:
   pre-fetching, at a client computing device via a communication network, map data for generating a digital map of a geographic area, prior to receiving an explicit request at the client computing device for the digital map of the geographic area from a user;
   determining, using one or more processors at the client computing device, that the map data includes a reference to a remote resource not provided with the map data;
   retrieving, using the one or more processors, the remote resource via the communication network;
   storing the map data and the remote resource in a memory of the client computing device; and
   in response to a subsequent request from the user, retrieving the map data and the remote resource from the memory of the client computing device to generate the digital map for display at the client device, without transmitting additional requests via the communication network.

2. The method of claim 1, wherein the remote resource is a raster image.

3. The method of claim 1, wherein the map data is pre-fetched from a first server and wherein the remote resource is retrieved from a second server.

4. The method of claim 1, further comprising analyzing user-data to identify the map data for pre-fetching.

5. The method of claim 4, wherein the user-data is data relating to a plurality of users.

6. The method of claim 4, wherein the user-data is data relating to a particular user of the client computing device.

7. The method of claim 6, wherein the user-data includes one or more of: (i) data representing the particular user's historical map use; (ii) data representing the particular user's historical map searches; (iii) data representing locations visited by the particular user; or (iv) data representing preferences explicitly set by the particular user.

8. The method of claim 4, wherein the user-data includes a list of commonly displayed graphic features.

9. The method of claim 8, wherein the list of common displayed graphic features includes one or more of: a road shield icon, a tree icon, a camping icon, a restaurant icon, a mass transit icon, or a hospital icon.

10. The method of claim 1, wherein the reference includes a URL to the remote resource.

11. A client computing device comprising:
    a display;
    a processor communicatively coupled to the display;
    a memory communicatively coupled to the processor, the memory storing a mapping module including instructions that, when executed by the processor, causes the client computing device to:
    (i) pre-fetch map data for generating a digital map of a geographic area;
    (ii) determine that the map data includes a reference to a remote resource not provided with the map data;
    (iii) retrieve the remote resource via the communication network;
    (iv) store the map data and the remote resource in a memory of the client computing device; and
    (v) in response to a subsequent request from the user, retrieve the map data and the remote resource from the memory to generate the digital map for display at the display, without transmitting additional requests via the communication network.

12. The client computing device of claim 11, wherein the remote resource is a raster image.

13. The client computing device of claim 11, wherein the map data is pre-fetched from a first server and wherein the remote resource is retrieve from a second server.

14. A remote mapping system comprising:
one or more servers configured to:
(i) transmit, to a client computing device via a communication network, map data for generating a digital map of a geographic area, prior to the client computing device receiving an explicit request for the digital map of the geographic area from a user, wherein the map data includes a reference to a remote resource not provided with the map data; and
(ii) transmit, to the client computing device via the communication network, the remote resource in response to a request from the client computing device for the remote resource.

15. The remote mapping system of claim 14, wherein the one or more servers comprise:
a first server configured to transmit, to the client computing device via the communication network, the map data for generating the digital map of a geographic area; and
a second server configured to transmit, to the client computing device via the communication network, the remote resource in response to the request from the client computing device for the remote resource.

16. The remote mapping system of claim 14, wherein the remote resource is a raster image.

17. The remote mapping system of claim 14, wherein the one or more servers are further configured to analyze user-data to identify the map data for pre-fetching.

18. The remote mapping system of claim 17, wherein the user-data is data relating to a plurality of users.

19. The remote mapping system of claim 17, wherein the user-data is data relating to a particular user of the client computing device.

20. The remote mapping system of claim 19, wherein the user-data includes one or more of: (i) data representing the particular user's historical map use; (ii) data representing the particular user's historical map searches; (iii) data representing locations visited by the particular user; or (iv) data representing preferences explicitly set by the particular user.

* * * * *